United States Patent [19]

Cocks et al.

[11] Patent Number: 5,348,812
[45] Date of Patent: * Sep. 20, 1994

[54] CARBON-ION FUEL CELL FOR THE FLAMELESS OXIDATION OF COAL

[76] Inventors: Franklin H. Cocks, 5 Learned Pl., Durham, N.C. 27705; Henry LaViers, P.O. Box 90302 Duke U, Durham, N.C. 27708

[*] Notice: The portion of the term of this patent subsequent to Mar. 29, 2011 has been disclaimed.

[21] Appl. No.: 129,996

[22] Filed: Sep. 30, 1993

[51] Int. Cl.$^5$ ............................................. H01M 8/12
[52] U.S. Cl. ............................................. 429/13; 429/33; 429/102
[58] Field of Search .................. 429/13, 17, 19, 20, 429/30, 33, 16, 101, 102, 105, 107, 191; 252/62.2; 204/421

[56] References Cited

U.S. PATENT DOCUMENTS

| | | | |
|---|---|---|---|
| 460,122 | 9/1891 | Edison | 429/17 |
| 3,980,543 | 9/1976 | Eckfeldt | 204/195 |
| 4,598,028 | 7/1986 | Rossing et al. | 429/30 |
| 4,644,751 | 2/1987 | Hsu | 60/676 |
| 4,826,740 | 5/1989 | Costa | 429/17 |
| 4,921,765 | 5/1990 | Gmeindl | 429/16 |

*Primary Examiner*—Anthony Skapars

[57] ABSTRACT

Fuel cells containing an anode of molten metal into which carbon has been dissolved, and a carbon-ion electrolyte, can be improved by making the molten metal the same that used as the cation in the solid carbon-ion electrolyte. Molten metals so selected are advantageous to use with carbon-ion electrolytes with the fluorite or perovskite prototype crystal structures. The improved device is an electrochemical fuel cell consisting of a cathode in contact with oxygen, an anode of liquid metal, especially molten metals of the lanthanide group or actinide group containing dissolved carbon, and a lanthanide- or actinide-containing carbon-ion electrolyte separating the anode and cathode electrodes.

5 Claims, 1 Drawing Sheet

CARBON-ION FUEL CELL FOR THE FLAMELESS OXIDATION OF COAL

BACKGROUND OF THE INVENTION

This invention relates to improved electrochemical cells, including fuel cells, made possible by using a carbon-ion electrolyte and specifically to an improved combination of carbon-ion electrolyte and molten metal anode. Preferred use of the invention is set forth in producing electric power, with the fuel for the process being carbon dissolved in a molten metal.

SUMMARY OF THE PRIOR ART

This invention provides an improvement in the invention disclosed in our prior application, Ser. No. 07/925,506, now U.S. Pat. No. 5,298,340 titled: A Carbon-Ion Fuel Cell for the Generation of Electricity by the Flameless Combustion of Coal, filed Aug. 5,1992.

SUMMARY OF THE INVENTION

The improved cell uses the dissolution of carbon into a molten metal from the lanthanide metal group of the periodic table: La, Ce, Pr, Nd, Pm, Sm, Eu, Gd, Tb, Dy, Ho, Er, Tm, Yb, and Lu or from the actinide group of the periodic table: Ac, Th, Pa, Np, Pu, Am, Cu, Bk, Cf, Es, Fm, Md, No, and Lw. The electrolyte for the carbon ions is preferably a lanthanide carbide of the fluoride crystal structure or a mixed metal carbide of the perovskite crystal structure with actinide metal ions The use of a molten metal lanthanide as the anode of the fuel cell is found to increase the chemical and thermodynamic stability of the liquid metal anode material in regard to the lanthanide-containing carbon-ion electrolyte material and the use of a molten metal actinide is found to increase the chemical and the thermodynamic stability of this anode with regard to the actinide-containing carbon-ion electrolyte material.

OTHER OBJECTS AND ADVANTAGES OF THE INVENTION

It is an object of the invention to provide superior combinations of molten metal anodes and carbon-ion electrolytes in fuel cells that will provide improved sources of electricity from the chemical energy present in the carbon of coal, without the need for flames or burning.

The molten metal in the reservoir contains dissolved carbon. The carbon dissolved in the molten metal serves as the fuel supply of the fuel cell. The molten metal is also an electronic conductor and serves as the anode of the fuel cell. Two electrical contacts, one contact (11) touching the cathodes at the tube manifold, and one contact (12) touching the molten metal anode in the reservoir, are connected through electrical wiring (13) to a power circuit (14). The atmosphere above the molten metal reservoir is one of nitrogen gas to prevent oxidation of the hot metal or carbon.

Figure 1:
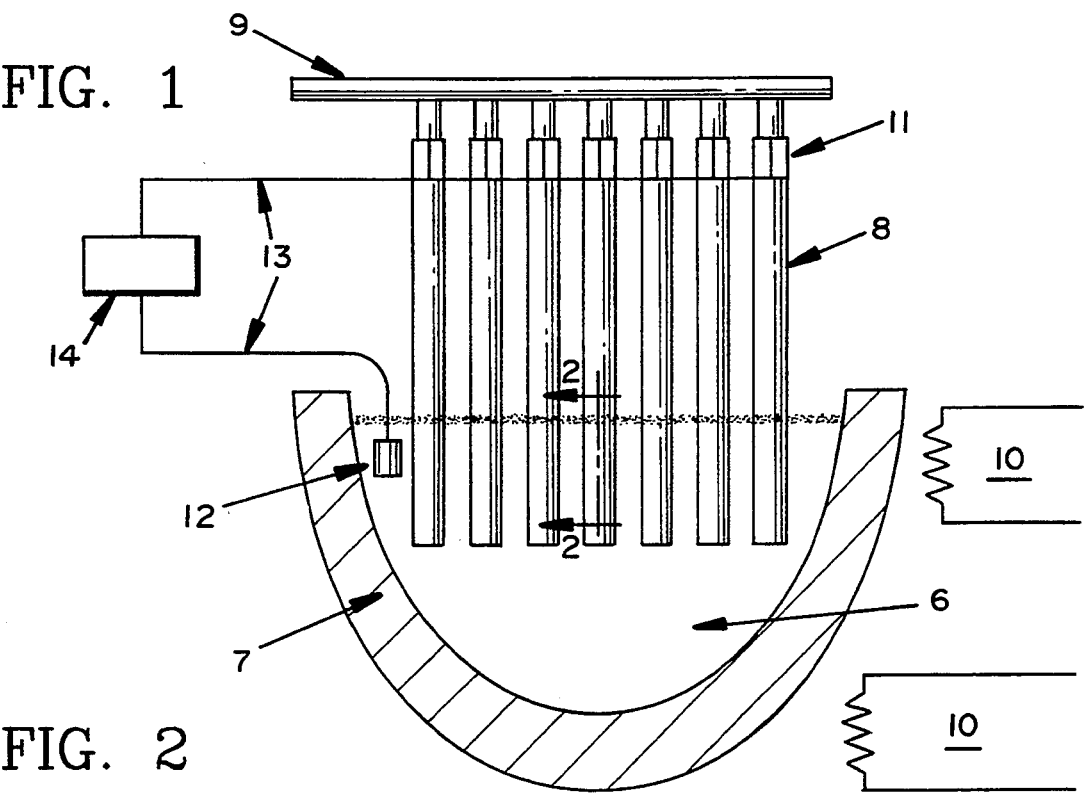
FIG. 1 is a cross-sectional view of an apparatus for producing electric power using a carbon-ion fuel cell. Numbers in parenthesis refer to the numbers designating the parts of the apparatus as depicted in the drawings. The apparatus consists of: a reservoir (7) containing molten metal (6) and a multitude of tubes (8) immersed in the molten metal of the reservoir. An oxygen containing mixture of gases is pumped through the inside of the tubes by means of a manifold (9). The liquid metal is induced to flow around the tube structures in currents created by thermal convection. These convective currents are continuously maintained by a temperature gradient induced by differential heating of the reservoir of liquid metal by heaters (10).
Figure 2:
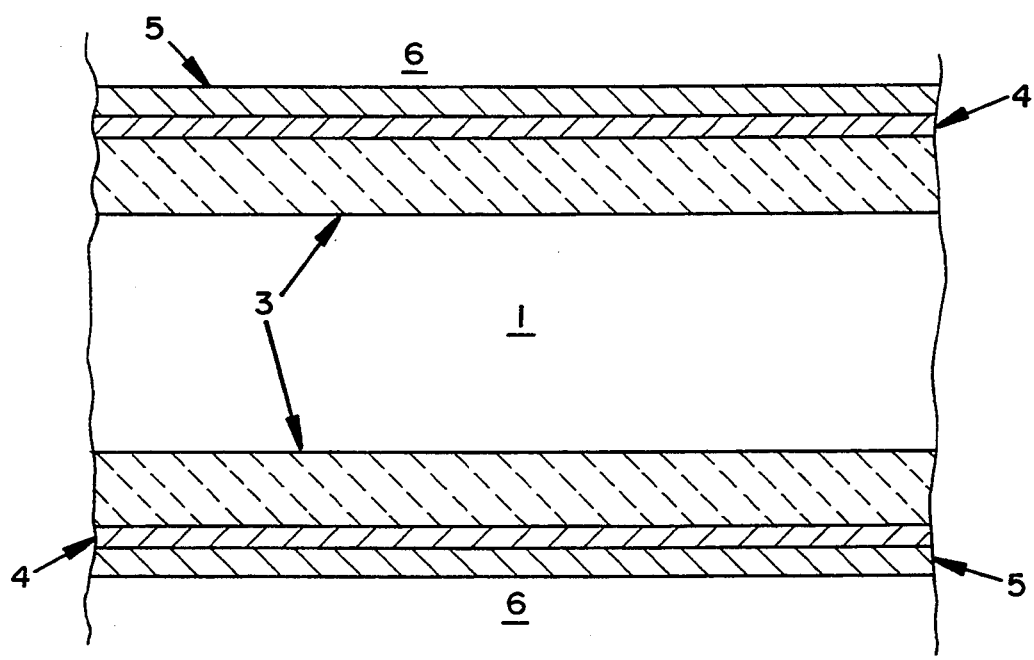

FIG. 2 is a cross-section of a tube through section 2—2 of FIG. 1. The walls of the tubes are made preferably of three layers of material. The first layer (3) is a refractory support structure porous to oxygen gas that gives the entire assembly strength and temperature stability. The second layer is the cathode of the fuel cell consists of a porous metal coating (4) deposited on the outside surface of the refractory tube. The third and outermost layer (5) is a thin layer of carbon-ion electrolyte material. Surrounding and in direct contact with the outside surface of the third layer of the tube wall is the molten metal (6). It is to be understood that while tubes are shown, the invention disclosed is not limited to the use of tubular shapes; other shapes, such as boxes, crucibles, or sheets may be used as well.

PHYSICS OF THE METHOD

The basic physics of this method is disclosed in prior application, Ser. No. 07/925,506, titled: A Carbon-Ion Fuel Cell for the Generation of Electricity by the Flameless Combustion of Coal, filed Aug. 5, 1992. In this present invention the physics and chemistry of the stability of the carbon-ion electrolyte with respect to the liquid metal solvent into which the carbon is dissolved involves the relative mutual reactivity of these two materials.

In the present invention the stability of the carbon-ion electrolyte and the liquid metal anode is increased by having elements in common in both the electrolyte and anode. It has now been discovered that there are particular combinations of electrolytes and molten metal anodes which permit thermodynamic equilibrium to be obtained. According to the Gibbs phase rule the number of phases, P, which are in thermodynamic equilibrium is related to the number of components, C, taken as the number of elements present together, and the number of degrees of freedom, F, of the system variables, which are in this case are temperature, T, pressure, S, and system composition, X. For systems of two elements, X equals 1 since both elements together must total to 100%. For systems of three elements, X equals 2, since the concentrations of two elements can be varied independently.

For a system of only two elements, the Gibbs phase rule can be written as:

$$P+F=C+2$$

If the pressure is fixed, this then reduces to:

$$P+F=C+1$$

When a single-phase solid carbon-ion electrolyte and a single phase liquid metal anode (P=2) are in contact, one then has, for the case of only two elements (C=2) present in the total system:

$$2+F=2+1$$

so that at a fixed pressure, either the temperature or the composition can be varied without destroying one of the two phases. These two phases will thus be in thermodynamic equilibrium even when either the composition or the temperature is fixed. Although the Gibbs phase rule gives theoretical thermodynamic results, it gives no information whatever on the actual chemical composition of the system. It has now been discovered that the combination of carbides of the lanthanide series, together with the same lanthanide element (in the molten state) that is used to form the lanthanide carbide, can form such a stable carbon-ion electrolyte system when the molten lanthanide element contains dissolved carbon. It has now been discovered that thermodynamically stable carbon-ion electrolyte/molten lanthanide anode pairs can be produced by these paired systems.

When the Gibbs phase rule is extended to pairs that contain a total of three elements at fixed pressure this rule becomes:

$$P+F=3+1$$

When only two phases, P, are present this becomes ti $2+F=3+1$

So that the number of degrees of freedom becomes 2, which means that both the temperature and composition can be varied without destroying one of the phases. As before, however, the Gibbs phase rule does not provide specific information on the chemistry of the system.

It has now been found that a second category of carbides composed of three elements, in addition to those of the fluorite prototype crystal structure, that are carbon-ion electrolytes are those with a perovskite crystal structure. Perovskite carbides have the generalized formula $ABC_3$ where A and B are ions (A and B can be the same ionized element or distinctly different chemical elements), but where the valences of A and B must add up to a total of $+12$, and where the ionic radius of cation A, the ionic radius of cation B and the ionic radius of the negative tetravalent ion of carbon obey the following mathematical relationship:

$$Radius_{A\ cation} + Radius_{carbon\ ion} = t(Radius_{B\ cation} + Radius_{carbon\ ion})$$

In the above mathematical relationship the symbol t stands for a tolerance factor that can vary from 0.7 to 1:7. Another way of stating this mathematical relationship without the use of an equation is that the ionic radius of cation A, the ionic radius of cation B and the ionic radius of the negative tetravalent ion of carbon must be such that the sum of the radius of cation A and the radius of the tetravalent anion of carbon are equal to a value which lies between 0.7 and 1.70 times the sum of the radius of cation B and the radius of the tetravalent anion of carbon, when the molten metal additionally contains a solid phase which contains at least two of the elements which form the perovskite solid ion electrolyte.

It has now been discovered that carbides having the perovskite crystal structure can be formed from particular actinide elements together with carbon dissolved into the molten form of the same actinide used to produce the carbon-ion electrolyte and that this combination will be thermodynamically stable even though the composition of the system changes.

Because of the sizes of the ions of elements, the following group elements have been found to be advantageous for use as element A: Bi, Np, Pa, U, Tc and to use as element B: As, Cr, F, Mn, Mo, N, Nb, P, Re, S, Se, and Te. When using these elements in the carbon-ion electrolyte, the molten metal anode consists preferably of the same metal or metals, which thus must be selected from the group: Bi, Np, Pa, U, Tc As, Cr, F, Mn, Mo, N, Nb, P, Re, S, Se, and Te, in order that thermodynamic stability be maximized.

DESCRIPTION OF THE PREFERRED EMBODIMENTS

One preferred combination of molten metal anode and solid carbon-ion electrolyte used in the invention is the molten metal Eu and the electrolyte compound $Eu_{1-x}Zr_xC_{2-x}$, a combination of the compounds $EuC_2$ and $ZrC_2$. $EuC_2$ alone has the body centered tetragonal crystal structure of the $CaC_2$ prototype at room temperature and converts to the fluorite crystal structure at about 350 degrees centigrade. $ZrC_2$ is a dopant of the NaCl crystal lattice structure and is added to $EuC_2$ to perform the dual role of stabilizing the fluorite crystal lattice structure over the operating temperature range of the fuel cell and also of creating a multitude of anion vacancies beneficial to carbon-ion conduction. In this compound x preferably lies within the range 0.03 to 0.35. A gas porous refractory tube that is permeable to oxygen is used for structural support. On the outer surface of this tube is then deposited a thin and gas porous layer of a noble metal. Next, the combined carbon-ion electrolyte compound $Eu_{1-x}Zr_xC_{2-x}$ is deposited onto the outer surface of the gas-porous noble metal.

The porous noble metal coating, which is permeable to oxygen gas and is electronically conductive, is the cathode of the cell and provides a low resistance electrical contact for connection to the electrical wiring by which means electrical power is extracted. The outside surfaces of the $Eu_{1-x}Zr_xC_{2-x}$ layer is in contact with Eu liquid metal into which carbon has been dissolved to serve as fuel for the cell.

The Eu liquid metal is the anode of the cell. Immersed in the liquid metal of the reservoir are electric contacts of a material resistant to the corrosive effects of the molten metal solvent. Connected to these contacts is a power generating circuit terminating at the cathode surfaces.

The liquid metal, shielded by argon or other means from contact with gaseous oxygen, is stirred by convective forces caused by a temperature difference from the top of the reservoir to the bottom. In operation, the carbon which is dissolved in the Eu liquid metal solvent, passes by diffusion in an ionized state through the carbon-ion electrolyte and reaches the noble metal layer disposed at the carbon-ion electrolyte/oxygen interface, where combination with oxygen occurs together with the transfer of electrons from the carbon to the oxygen. In this way the noble metal layer acts as the cathode in the cell whereas the liquid metal containing the carbon acts as the anode. By electrically connecting the anode and the cathode, through a load, electrical power may thus be produced.

In a second preferred embodiment the molten metal is Ce and the carbon-ion electrolyte is the compound $Ce_{1-x}Zr_xN_xC_{2-2x}$, a combination of the compounds $CeC_2$ and Zr, where x can vary from 0.01 to 0.45. $CeC_2$ alone has the body centered tetragonal crystal structure of the $CaC_2$ prototype at room temperature and converts to the fluorite crystal structure at about 1050 degrees centigrade. ZrN is a dopant of the NaCl crystal lattice structure and is added to $CeC_2$ to perform the dual role of stabilizing the fluorite crystal lattice structure over the operating temperature range of the fuel cell and of creating a multitude of anion vacancies beneficial to carbon-ion conduction in the compound. In this compound x preferably lies within the range 0.01 to 0.45. This compound acts as a pseudobinary (C=2) compound because the phase is a mixture only of $CeC_2$ and ZrN.

Gas-porous alumina refractory tubes that are permeable to oxygen are used for structural support of the carbon-ion membrane compound material. On the outer surface of these tubes are then deposited gas-porous, thin layers of a noble metal, preferably platinum. Next, the combined carbon-ion electrolyte compound $Ce_{1-x}Zr_xN_xC_{2-2x}$ is deposited by sputtering it onto the gas-porous platinum-coated outer surfaces of the gas-porous refractory alumina tubes. The cathode of the cell is the noble metal coating, which is permeable to oxygen gas and is electronically conductive to provide a low resistance electrical contact.

The outside surfaces of the $Ce_{1-x}Zr_xN_xC_{2-2x}$ layer is in contact with the liquid Ce that serves as the anode of the fuel cell and into which carbon has been dissolved to serve as fuel for the cell. Immersed in the liquid Ce of the reservoir are electric contacts of a material resistant to the corrosive effects of the molten Ce solvent, such as clay-stabilized graphite. Connected to these contacts is a power consuming circuit terminating at the platinum coating at the cathode surfaces. The liquid Ce is stirred by convective forces caused by a temperature difference from the top of the reservoir to the bottom or by mechanical means.

In operation, the carbon which is dissolved in the liquid Ce solvent to convert part of the carbon to anionized state to produce carbon-ions and electrons, is effectively purified of sulfur by precipitation of the very high melting point and insoluble refractory CeS. However, even if the sulfur were not removed in the slag, it would still not be oxidized within the fuel cell due to the inability of the carbon-ion electrolyte to pass sulfur ions. The carbon-ions pass by diffusion in an ionized state through the carbon-ion electrolyte and reach the noble metal layer disposed at the carbon-ion electrolyte/oxygen interface, where combination with oxygen-ions occurs together with the transfer of electrons via an external electrical power generating circuit.

In this way the noble metal layer acts as the cathode in the cell whereas the liquid metal containing the carbon acts as the anode. Although not all of the carbon atoms in the dissolved melt are ionized, as the ionized carbon passes by diffusion through the electrolyte, fresh ions are formed so that the electrical balance in the overall electrochemical reaction is preserved. Electrical power is obtained from this carbon fuel cell by connecting the anode and the cathode through an electrical load. The liquid metal is thus metal acting as an anode by converting part of said carbon to an ionized state to produce carbon-ions and electrons, after which the passage of a current of these electrons through a power generating circuit is to a cathode where these electrons react with oxygen to produce oxygen-ions, and the diffusion of the carbon-ions from the molten metal anode through a solid carbon-ion electrolyte to the cathode, enables the carbon-ions to react with the oxygen-ions to produce oxidized carbon, including either or both carbon monoxide or carbon dioxide.

In a third preferred embodiment the preferred molten metal is Eu and the carbon-ion electrolyte is the compound $(EuC_2)_{1-x}(EuN)_x$, a combination of the compounds $EuC_2$ and EuN. In this compound, x preferably lies within the range 0.01 to 0.45. $EuC_2$ alone has the body centered tetragonal crystal structure of the $CaC_2$ prototype at room temperature but converts to the cubic fluorite crystal structure at about 350 degrees centigrade. EuN is a dopant of the cubic NaCl crystal lattice structure and is added to $EuC_2$ to perform the role of stabilizing the cubic fluorite crystal lattice structure over the operating temperature range of the fuel cell creating a multitude of anion vacancies beneficial to carbon-ion conduction in the compound, and decreasing the electronic conductivity of the resulting superionic conductor material.

In a fourth preferred embodiment the preferred molten metal is uranium and the carbon-ion electrolyte is the compound $USeZr_xN_xC_{3-3x}$ a combination of the compounds $USeC_3$ and ZrN. As was the case previously, this compound acts as a binary (C=2) system because it is a mixture of two phases, each of fixed composition. $USeC_3$ alone has the perovskite crystal structure of the $CaTiF_3$ prototype. ZrN is a dopant having the NaCl crystal lattice structure. In this compound, x preferably lies within the range 0.01 to 0.45.

Gas-porous alumina refractory tubes that are permeable to oxygen are used for structural support of the carbon-ion membrane compound material. On the outer surface of these tubes are then deposited gas-porous, thin layers of a noble metal, preferably platinum. Next, the combined carbon-ion electrolyte compound $USeZr_xN_xC_{3-3x}$ is deposited by sputtering it onto the gas-porous platinum-coated outer surfaces of the gas-porous refractory alumina tubes. The cathode of the cell is the porous noble metal coating, which is permeable to oxygen gas and is electronically conductive to provide a low resistance electrical contact.

The outside surfaces of the $USeZr_xN_xC_{3-3x}$ layer is in contact with the liquid U that serves as the anode of the fuel cell and into which carbon has been dissolved to serve as fuel for the cell. Immersed in the liquid U of the reservoir are electric contacts of a material resistant to the corrosive effects of the molten U solvent, such as clay-stabilized graphite. Connected to these contacts is a power consuming circuit terminating at the platinum coating at the cathode surfaces. The liquid U is stirred by convective forces caused by a temperature difference from the top of the reservoir to the bottom or by mechanical means.

The carbon-ions pass by diffusion in an ionized state through the carbon-ion electrolyte and reach the noble metal layer disposed at the carbon-ion electrolyte/oxygen interface, where combination with oxygen-ions occurs together with the transfer of electrons via an external electrical circuit.

In this way the noble metal layer acts as the cathode in the cell whereas the liquid metal containing the carbon acts as the anode. Although not all of the carbon atoms in the dissolved melt are ionized, as the ionized carbon passes by diffusion through the electrolyte, fresh ions are formed so that the electrical balance in the overall electrochemical reaction is preserved. Electrical power is obtained from this carbon fuel cell by connecting the anode and the cathode through an electrical load.

We claim:

1. An improved process for flameless oxidation of carbon to produce electric power in which carbon is dissolved into a molten metal, said metal acting as an anode by converting part of said carbon to an ionized state to produce carbon-ions and electrons, the passage of a current of said electrons through a power generating circuit to a cathode where said electrons react with oxygen to produce oxygen-ions, diffusion of said carbon-ions through a solid carbon-ion electrolyte having a fluorite crystal structure to said cathode, where said carbon-ions react with said oxygen-ions to produce oxidized carbon, wherein the improvement comprises use of a molten metal selected the lanthanide group consisting of: La, Ce, Pr, Nd, Pm, Sm, Eu, Gd, Tb, Dy, Ho, Er, Tm, Yb, and Lu, said fluorite crystal structure containing at element selected from said lanthanide group.

2. The improved process of claim 1 in which said molten metal is selected from the series of elements from which the cations of the carbon-ion electrolyte compound have been formed.

3. An improved process for the flameless oxidation of carbon to produce electric power in which carbon is dissolved into a molten metal, said molten metal acting as an anode by converting part of said carbon to an ionized state to produce carbon-ions and electrons, the passage of a current of said electrons through a power generating circuit to a cathode where said electrons react with oxygen to produce oxygen-ions, the diffusion of said carbon-ions through a carbon-ion electrolyte to said cathode, wherein the improvement comprises the selection of said carbon-ion electrolyte from the group of carbon-ion electrolytes having a perovskite crystal structure of the form $ABC_3$, where C is the negative tetravalent ion of carbon and A and B are cations of elements taken from the periodic table with the restrictions that: (a) the sum of ionic valences of cations A and B total $+12$; and (b) that the ionic radius of cation A, the ionic radius of cation B and the ionic radius of the negative tetravalent ion of carbon obey a mathematical relationship that the sum of said radius of cation A and said radius of the ion of carbon are equal to a value which lies between 0.7 and 1.70 times the sum of said radius of cation B and said radius of the anion of carbon, when said molten metal additionally contains a solid phase which contains at least two of the elements which form the perovskite solid ion electrolyte.

4. An improved process for the flameless oxidation of carbon to produce electric power in which carbon is dissolved into a molten metal as described in claim 3 wherein the cation of the element A is selected from the group consisting of Bi, Np, Pa, U and Tc and the cation of element B is selected from the group consisting of As, Br, Cl, Cr, F, I, Mn, Mo, N, Nb, 0, P, Re, S, Se, and Te.

5. An improved process for the flameless oxidation of carbon to produce electric power as described in claim 3, wherein the improvement comprises the use of a molten metal consisting of one or more elements selected from the group of consisting of Bi, Np, Pa, U, Tc As, Cr, F, Mn, Mo, N, Nb, P, Re, S, Se, and Te.

* * * * *